United States Patent
Labelle (10) Patent No.: US 7,809,814 B2
(45) Date of Patent: Oct. 5, 2010

(54) METHOD AND DEVICE FOR MANAGING REQUESTS IN AN ARCHITECTURE OF THE CLIENT-SERVER TYPE

(75) Inventor: Lilian Labelle, St Samson sur Rance (FR)

(73) Assignee: Canon Kabushiki Kaisha, Tokyo (JP)

( * ) Notice: Subject to any disclaimer, the term of this patent is extended or adjusted under 35 U.S.C. 154(b) by 1948 days.

(21) Appl. No.: 10/775,173

(22) Filed: Feb. 11, 2004

(65) Prior Publication Data

US 2004/0187124 A1    Sep. 23, 2004

(30) Foreign Application Priority Data

Feb. 14, 2003   (FR)  .................................... 03 01829

(51) Int. Cl.
  *G06F 15/173*  (2006.01)
(52) U.S. Cl. ...................... 709/223; 709/224; 709/203; 709/217
(58) Field of Classification Search ................. 709/203, 709/217, 223, 224
See application file for complete search history.

(56) References Cited

U.S. PATENT DOCUMENTS

| | | | | |
|---|---|---|---|---|
| 5,808,617 A * | 9/1998 | Kenworthy et al. | ......... | 345/421 |
| 5,826,031 A * | 10/1998 | Nielsen | ......... | 709/233 |
| 5,956,039 A | 9/1999 | Woods et al. | ......... | 345/419 |
| 6,081,278 A * | 6/2000 | Chen | ......... | 345/473 |
| 6,098,064 A | 8/2000 | Pirolli et al. | ......... | 707/2 |
| 6,098,099 A * | 8/2000 | Ellesson et al. | ......... | 709/223 |
| 6,336,143 B1 * | 1/2002 | Diedrich et al. | ......... | 709/231 |
| 6,442,658 B1 | 8/2002 | Hunt et al. | ......... | 711/158 |
| 6,463,508 B1 * | 10/2002 | Wolf et al. | ......... | 711/133 |
| 6,697,859 B1 * | 2/2004 | Takahashi | ......... | 709/225 |
| 6,944,710 B2 * | 9/2005 | Regev et al. | ......... | 711/108 |
| 7,092,983 B1 * | 8/2006 | Tyrrell, III | ......... | 709/201 |
| 7,140,016 B2 * | 11/2006 | Milovanovic et al. | ......... | 718/100 |
| 7,389,356 B2 * | 6/2008 | Shao et al. | ......... | 709/235 |
| 7,467,549 B2 * | 12/2008 | Forgue | ......... | 73/313 |
| 2001/0020943 A1 * | 9/2001 | Hijiri et al. | ......... | 345/473 |
| 2002/0124100 A1 | 9/2002 | Adams | ......... | 709/232 |

FOREIGN PATENT DOCUMENTS

EP    1 041 497 A2    10/2000

* cited by examiner

*Primary Examiner*—Lashonda T Jacobs
(74) *Attorney, Agent, or Firm*—Fitzpatrick, Cella, Harper & Scinto (57) ABSTRACT

In order to manage requests in at least two distinct classes, relating to multimedia data, exchanged by a communication apparatus and at least one data source connected through a communication network, at the communication apparatus:
  at least one request in at least a first class of requests is enabled (E505, E510), the enabling taking account of the multimedia data received from at least a second class of requests, the requests of the second class being predictable in time;
  a priority (E512, E507) is allocated dynamically to each of the enabled requests, in accordance with characteristics of said enabled requests; and
  a priority (E512) is allocated dynamically to each of the enabled requests of the second class in accordance with the time remaining until the next request of the second class.

19 Claims, 7 Drawing Sheets

FIG. 1

FIG. 2a pan original        Zoom (x2)

zoom

METHOD AND DEVICE FOR MANAGING REQUESTS IN AN ARCHITECTURE OF THE CLIENT-SERVER TYPE

BACKGROUND OF THE INVENTION

1. Field of the Invention

The present invention relates to a method and device for managing requests in an architecture of the client-server type.

2. Brief Description of the Related Art

For several years the general public has had the possibility of exchanging digital data through the Internet. More than a fashionable phenomenon, the Internet has become an unprecedented tool for sending an electronic message and/or obtaining information on almost any subject, and this almost in real time. The first sites, commonly referred to as Web sites, made it possible to download an application (or a page to the HTML format), and to "play" it (or to display it using a browser).

Many changes have been made both with regard to the formats of the files transferred and to the transfer protocols. With regard more specifically to the HTML file format, Web pages have become interactive, thus enabling the user to personalize the display of these pages and to send requests to the server storing the site being visited. In addition, these pages have become more attractive since this format has made it possible to encapsulate animations over time of multimedia objects.

Nevertheless, the size of the files transferred, that is to say the files which contain an application or an HTML page, must be minimal since the bandwidth of the Internet is always limited to a few kilobytes. So that the downloading time is not too great, the HTML format has been designed to make it possible to organize the data to be transferred in a hierarchic manner. Thus, by organizing these data hierarchically according to their order of use by the browser, it is possible to display an HTML page or to play an animation without waiting until all the file is downloaded. This property enables a user to browse on a site more easily.

For animations of multimedia objects, a file format (SWF) has been defined which makes it possible to describe animations over time of multimedia data using vectorial data. Thus the size of the HTML files remains within acceptable proportions. In addition, this format makes it possible to play the animation without waiting until all the file is downloaded. For these two reasons, this format is widely used for including animations of multimedia objects in an HTML page, and sites are beginning to appear designed exclusively with "Flash" data (the name commonly used to designate animations resulting from an SWF file).

As soon as a user requests the downloading of multimedia data from a server, the latter sends to the user a file which comprises so-called minimal data. From these data, the browser constructs an HTML page and displays it on a screen. Where this page contains a Flash animation, the data dedicated to this animation are interpreted by a Flash "decoder" integrated in the browser.

The data file can also comprise a set of commands which make it possible to recover additional multimedia data, once the file is downloaded. In addition, in the majority of applications, the minimal data enable the user to interact with the server in order to be able to recover additional information. This is what will be referred to hereinafter as "requests".

As will be seen later, the present invention can be applied to any system for receiving multimedia data which includes requests of different origins.

In general terms, the requests are of different natures. They can be predictable, where they are included in the file downloaded initially and the data recovered, through these requests, are necessary to the correct running of an application (or of an animation). This set of requests is predefined by the designer of the application or of the animation. Others are unpredictable, such as the requests sent by the user. Finally, a last class of request makes it possible to anticipate the pre-fetching of multimedia data. This is because, as soon as a user has downloaded a file, it is possible to anticipate the future requests of this user and to pre-fetch data, so as to respond to these future requirements without delay. These requests are generally not predictable, since they change according to the actual requests of a user and the running of the application (or of the animation).

The majority of multimedia data transmission systems are not confronted with the problem of managing requests of different natures since the format of the data encapsulated in the file does not provide for the possibility of defining requests of different natures. Only the requests emanating from the user are managed, and sometimes those related to the application. Nevertheless, these systems do not manage several classes of requests at the same time.

The document U.S. Pat. No. 6,442,658 discloses a mechanism which manages a set of requests so that a Flash animation can be run correctly.

The SWF file used for defining a Flash animation is broken down into segments of data independent from one another. For example, a first segment comprises video data and a second segment image data. When the client machine receives the first segment, the Flash "decoder" must check that the resources necessary for playing the video, that is to say the memory available and the video data decoder, in cases where the data of the segment are coded, are available on the client machine. If the decoder is present on the client machine, the segment is played. In the contrary case, the Flash "decoder" extracts the location of this resource from the SWF file—usually an Internet link on a server—and sends the request to this server. Once the response has been received, the video decoder is installed on the client machine and the segment is played.

Thus, if several segments must be played, the most commonplace solution is to check whether all the resources necessary for playing the segments of an SWF file are available on the client machine. In a case where some of them are not, it is necessary to send requests to the various servers through information extracted from the SWF file.

Nevertheless, this solution cannot be envisaged since it would require too much storage memory and excessively long downloading times before being able to play the first segment. The document U.S. Pat. No. 6,442,658 proposes to resolve this problem by including a mechanism for pre-fetching these resources. This is because, when a segment is in the process of being played, this process downloads the data and the resources of the segment which will be played just afterwards. Once played, the data and resources are eliminated from the storage memory, thus avoiding an overloading of this memory.

The problem resolved by this document therefore consists of defining the segment which will be played at the end of the execution of the current segment. For this purpose, a priority is associated with each segment. This priority is the combination of the time necessary for the recovery of the data and resources and the probability that the segment is played just after the current segment.

The mechanism described in this document manages only one class of pre-fetching requests. In addition, the set of requests considered in this document is static, that is to say no new pre-fetching request is generated.

SUMMARY OF THE INVENTION

The purpose of the present invention is to remedy this drawback by making it possible to manage the requests in various classes and to generate new pre-fetching requests during the execution of an application and according to the behavior of the user.

For this purpose, the present invention provides a method of managing requests in at least two distinct classes, relating to multimedia data, exchanged by a communication apparatus and at least one data source connected through a communication network, remarkable in that the method comprises steps, performed at the communication apparatus, of:

enabling at least one request of at least a first class of requests, the enabling taking account of the multimedia data received from at least a second class of requests, the requests of the second class being predictable in time;

dynamically allocating a priority to each of the enabled requests, in accordance with characteristics of the enabled requests; and dynamically allocating a priority to each of the enabled requests of the second class in accordance with the time remaining until the next request of the second class.

The invention thus makes it possible, by virtue of the allocation of priorities to the various requests, to manage requests in different classes.

The enabling step makes it possible to temporarily authorize (or not) the sending of each of the requests.

The dynamic allocation step makes it possible to hierarchically organize the enabled requests so as to recover the data which are the most useful at a given moment.

According to a particular feature, the method also comprises a step of deciding with regard to the transmission of at least one enabled request, according to the priority allocated to this request.

This makes it possible to manage the continuous sending of the requests, so as to optimize the use of the network bandwidth.

According to a particular feature, this method also comprises a step of updating the requests in at least a first class, the updating taking account of the multimedia data received from at least one request in at least a second class.

In response to these requests, data are received and stored. Analyzing these data makes some requests obsolete, since the data are already recovered. Moreover, new requests can be created since new requirements may emanate from the user through a graphical interface. Finally, according to the data received, some requests must be merged since, considered individually, they make it possible to recover only a minute proportion of the data. As each request has a non-compressible header, it may happen that the quantity of data recovered is very small compared with the size of the requests. This merging of requests thus makes it possible to optimize the bandwidth of the network by minimizing the sending of requests. The updating step enables these various cases to be managed.

In a particular embodiment, the communication apparatus and the data source are connected by a connection of the HTTP type.

The data can for example be Flash animations and/or image data compressed according to the JPEG2000 standard.

The requests can be associated with the animation of an object and/or with the production of a zoom or panoramic shot or a change of quality on an image and/or with interactions between a user and an animation.

For the same purpose as indicated above, the present invention also provides a device for managing requests in at least two distinct classes, relating to multimedia data, exchanged by a communication apparatus and at least one data source connected through a communication network, remarkable in that the device comprises:

a module for enabling at least one request in at least a first class of requests, the enabling taking account of the multimedia data received from at least a second class of requests, the requests of the second class being predictable in time;

a module for dynamically allocating a priority to each of the enabled requests, in accordance with characteristics of the enabled requests; and a module for dynamically allocating a priority to each of the enabled requests of the second class in accordance with the time remaining until the next request of the second class.

The present invention also relates to a communication apparatus comprising a device as above.

The invention also relates to:

an information storage means which can be read by a computer or a microprocessor storing instructions of a computer program, making it possible to implement a method as above, and an information storage means which is removable, partially or totally, and which can be read by a computer or a microprocessor storing instructions of a computer program, making it possible to implement a method as above.

The invention also relates to a computer program product able to be loaded in a programmable apparatus and comprising sequences of instructions for implementing a method as above, when this program is loaded in and executed by the programmable apparatus.

The particular features and the advantages of the request management device, of the communication apparatus, of the various storage means and of the computer program product being similar to those of the method according to the invention, they are not repeated here.

Other aspects and advantages of the invention will emerge from a reading of the following detailed description of particular embodiments, given by way of non-limiting examples. The description refers to the accompanying drawings.

DETAILED DESCRIPTION OF THE PREFERRED EMBODIMENTS

Reference can usefully be made to the JPEG 2000 Part 9 specification. A copy of that document is attached to the present description and its contents is incorporated herein by reference.

Figure 1:
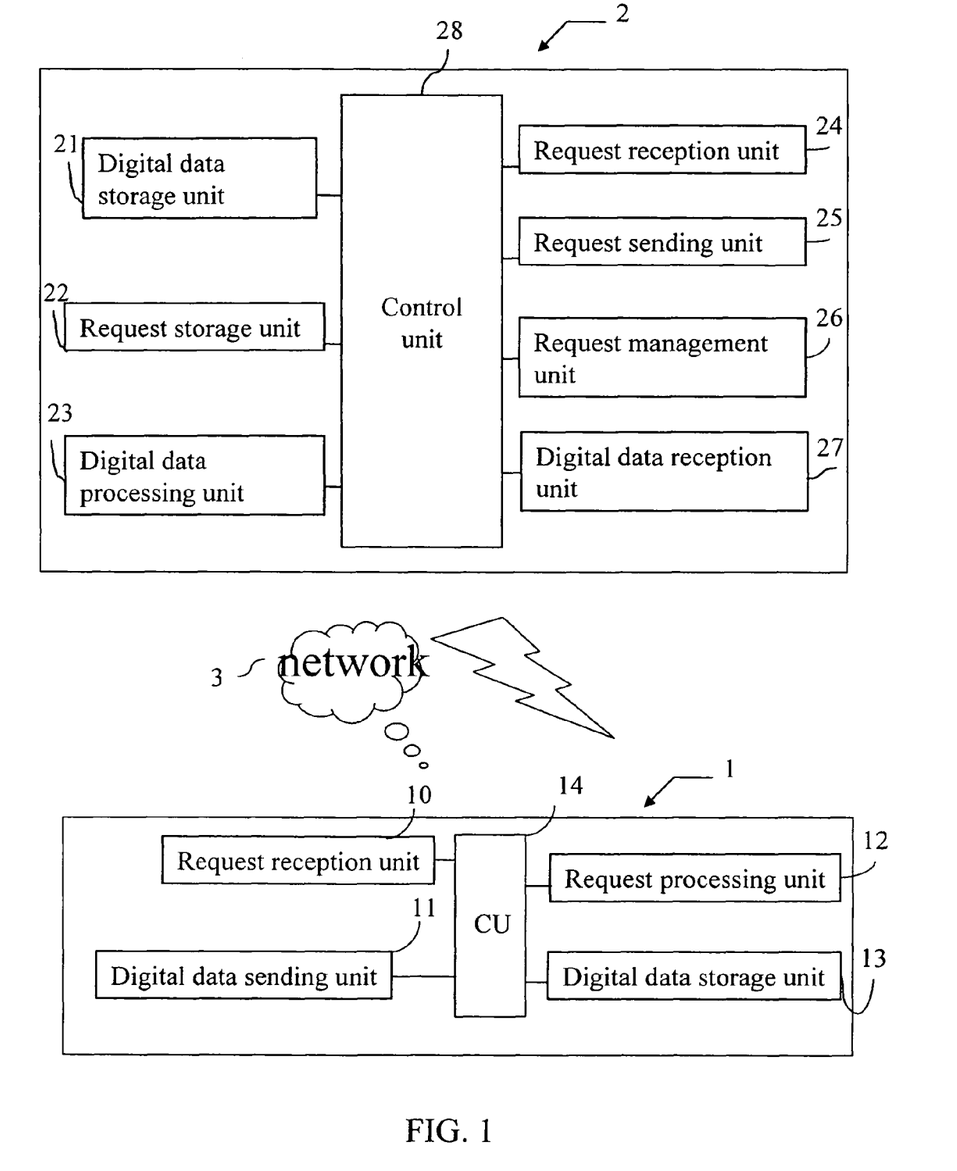
FIG. 1 illustrates schematically a multimedia data transmission device implementing the present invention, in a particular embodiment.

The block diagram in FIG. 1 illustrates the general architecture of a device for transmitting digital data point to point between a so-called server machine and a so-called client machine, implementing the invention.

This device can comprise electronic elements and/or comprise software elements.

The device depicted in FIG. 1 comprises a so-called client machine 2, which is a communication apparatus, and a so-called server machine 1, which constitutes a data source. These machines are connected by a communication network 3 through a connection. According to a preferred embodiment of the invention, an HTTP connection is used. Nevertheless, the invention can be implemented on other types of connections. The client machine 2 can, in a variant, be connected to several data sources of the machine server 1 type. In addition, it will be considered hereinafter that the transmission of the data takes place without any loss of information.

The client machine 2 in FIG. 1 comprises a digital data storage unit 21 which temporarily stores the digital data received. A request storage unit 22 for its part stores both the requests received by a request reception unit 24 and the requests emanating from a request management unit 26, as will be seen subsequently. The request management unit 26 is at the core of the invention. The client 2 also has a request sending unit 25.

The client machine 2 also comprises a digital data reception unit 27 whose role is to receive the digital data emanating from the server 1 and to send them to the data storage unit 21. In addition, the client machine 2 comprises a digital data processing unit 23 which processes the digital data stored in the unit 21. According to a preferred embodiment of the invention, the data processing unit 23 prepares the data contained in the storage unit 21 in order to display them on a screen (not shown in FIG. 1).

Finally, the client machine 2 comprises a control unit 28 which controls the functioning of the various units mentioned above.

The server machine 1 in FIG. 1 comprises a request reception unit 10 which receives the requests emanating from the client machine 2. The request reception unit 10 sends the requests to a request processing unit 12, which processes them. According to a preferred embodiment of the invention, this processing consists of recovering the digital data required, from a digital data storage unit 13, and formatting them and sending them through a digital data sending unit 11. The server machine 1 also comprises a control unit 14 which controls the functioning of the various units mentioned above.

According to a preferred embodiment of the invention, an HTTP connection is established between the client 2 and server 1 machines. For this purpose, the request sending unit 25 and data reception unit 27 of the client machine 2 and the request reception unit 10 and data sending unit 11 of the server machine 1 implement this protocol, so as to be able to exchange data.

According to a preferred embodiment of the invention, the digital data exchanged are of two natures: Flash animations and/or compressed image data according to the JPEG2000 standard.

The Flash animations are stored in files having an extension ".swf". Hereinafter, this type of file will be referred to as SWF. These animations are widely used within Web pages even for completely defining a site. Through their vectorial format, they allow the introduction of animations over time of digital objects in the pages of a Web site, whilst keeping a reduced size for the SWF file.

Hereinafter it will be considered that an animation has been created and stored in the data storage unit 13 of the server machine 1.

Figure 2A:
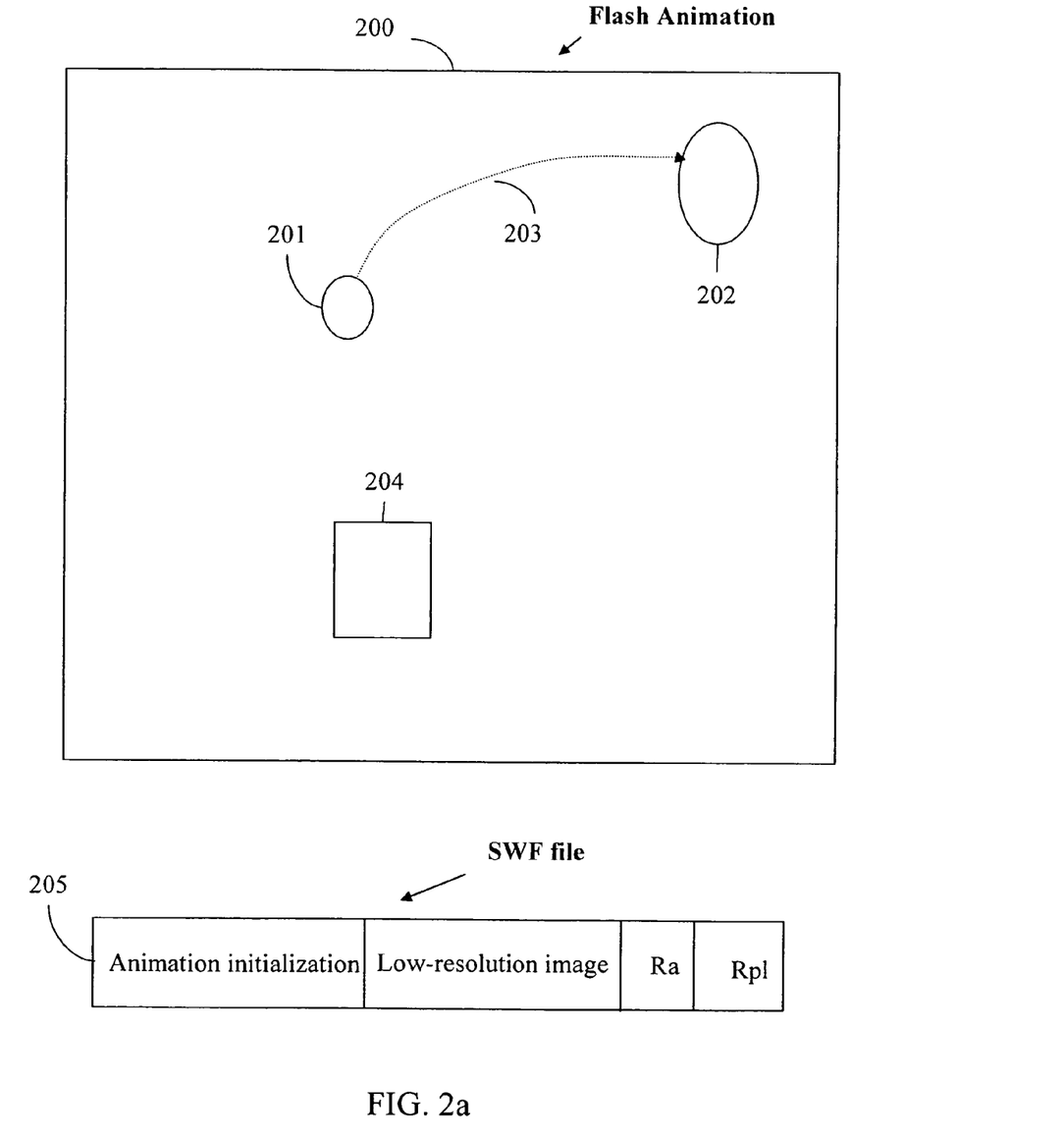
FIG. 2a illustrates schematically an example of Flash animation.

With reference to FIG. 2a, the SWF file 205 subsequently used contains an animation over time of an object, that is to say image data representing the object at the time of its initial position 201 as far as its final position 202 over the path 203, and a set of requests for recovering, from the server, supplementary information necessary for producing the animation. The requests associated with the animation of this object compose a class of requests hereinafter referred to as Ra.

In addition, the SWF file contains a image 204 compressed according to the JPEG2000 format. This format allows random access to the image data, that is to say the bit stream is formatted so as to be able to recover several spatial resolutions of the image for the same quality and several qualities for a given spatial resolution. Likewise, it is possible to recover part of the image at a given quality. The JPEG2000 file is stored in the data storage unit 13 of the server machine 1. According to a preferred embodiment of the invention, the low-quality version of the image is included in the SWF file.

Figure 2B:
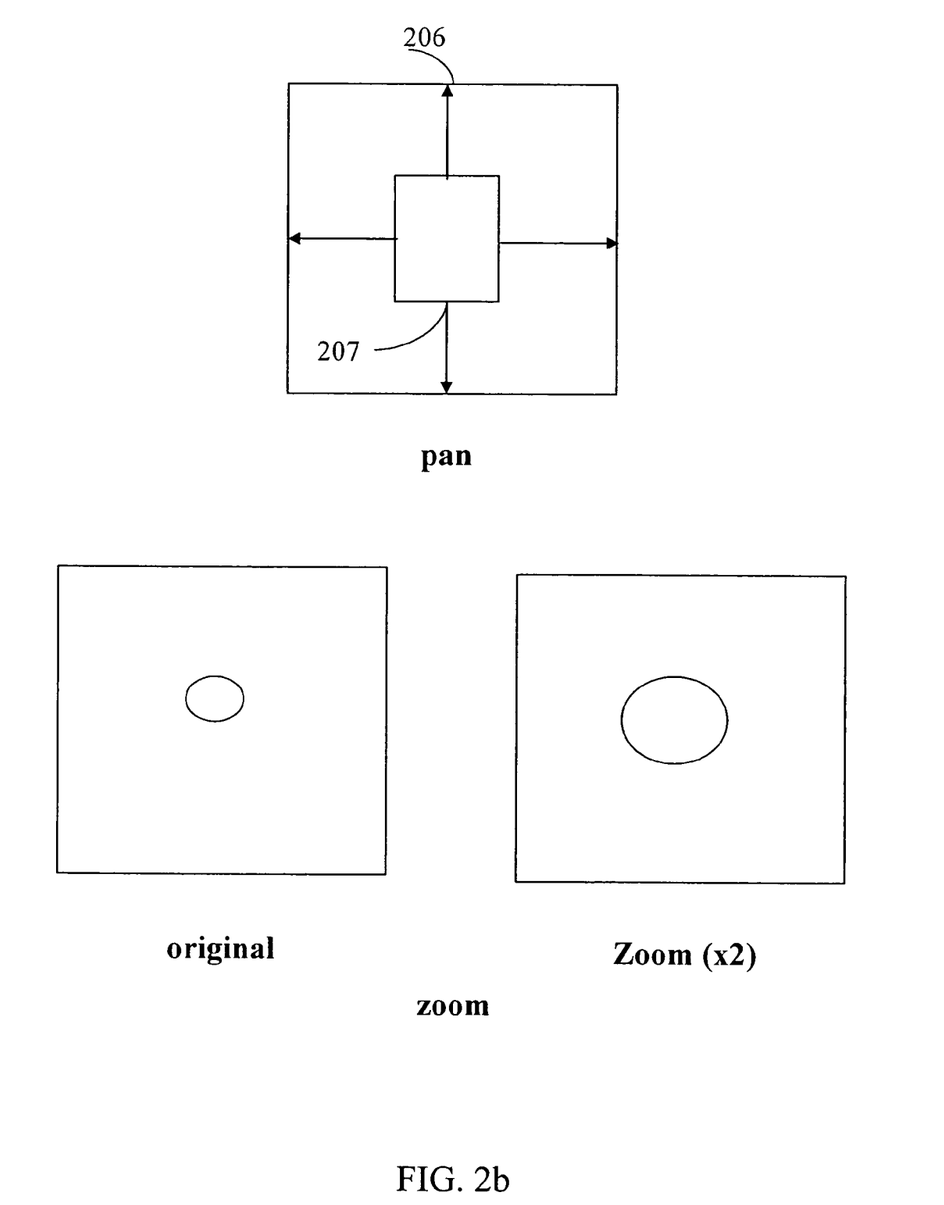
FIG. 2b illustrates schematically examples of actions on an image to the JPEG2000 format.

When the Flash animation is played, the user has the possibility of performing actions on the JPEG2000 image as described by FIG. 2b. According to a preferred embodiment of the invention, three actions are available: a zoom, a pan (in the case where the display window 207 of the animation is smaller than the image 206 to be displayed) and a change in quality: low, medium and high.

In order to anticipate these actions and therefore to improve the interactivity between the user and the animation, prefetching requests are included in the SWF file. These requests compose a class of requests hereinafter referred to as Rpl. They make it possible to obtain the image data for performing a zoom and a pan in each direction for a low quality. It should be noted that, if the image included in the SWF file has another quality (medium or high), these requests will be defined according to this choice. A request classed as Rpm and Rph will then be spoken of respectively. Subsequently, the class Rp will also be employed. This class groups together the requests in classes Rpl, Rpm and Rph.

As already mentioned, the user can interact with the animation by requesting a zoom on part of the image, a change of quality or a pan in one direction. These actions are transcribed in the form of requests which make up a class of requests hereinafter referred to as Ru.

In summary, three classes of requests are potentially present on the client machine 2: Ra, Rp and Ru. The requests in these three classes have different characters:
  requests in class Ra change over time and are predictable. They are optional since an SWF file which contains only JPEG2000 images will not need this type of request;
  requests in class Rp are predictable, in the sense that a set of requests is included in the SWF file. It should also be noted that these requests change according to the actions of the user. This is because, returning to our example, if the user modifies the quality of the image, the set of requests Rpl becomes obsolete and a new Rpm set (for example) must be generated so that the image data recovered have the same quality as the image displayed. This type of request is optional since it is possible to create an SWF file without providing pre-fetching requests (this is currently the case with tools for editing Flash animations);

Ru requests are unpredictable. This type of request is also optional since it may be that an animation does not authorize interactions with a user.

Figure 3:
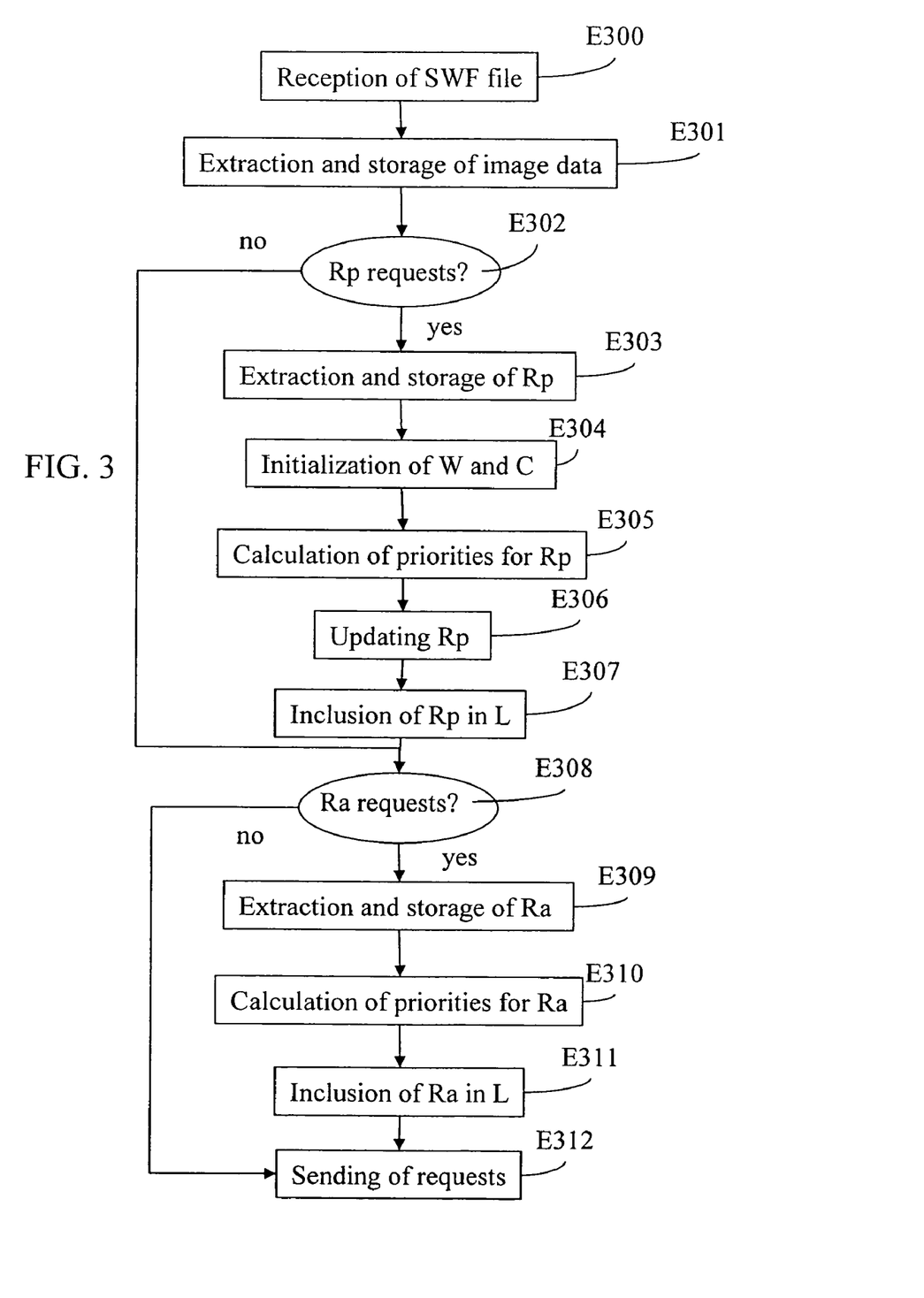
FIG. 3 is a flow diagram illustrating the main steps of initialization of the request management mechanism according to the present invention, in a particular embodiment.

The flow diagram in FIG. 3 illustrates the phase of initializing the device in FIG. 1. Once the user has established a connection with the server machine 1 of FIG. 1, the request sending unit 25 of the client machine 2 is connected to the request reception unit 10 of the server machine 1 so that the server can receive requests from the client. Likewise, the data sending unit 11 of the server machine 1 is connected to the data reception unit 27 of the client machine 2 so that the server machine can send digital data to the client machine. As soon as the client machine requests an animation, through the request sending unit 25, the server machine receives this request through the request reception unit 10 and recovers the SWF file to be sent from the data storage unit 13. This file is sent through the data sending unit 11.

The client machine 2 receives this file from the data reception unit 27 and stores it in the data storage unit 21 (step E300). In addition, during this step, the client machine 2 initializes a list L which will contain elements E relating to each request stored in the request storage unit 22, whatever the class to which the request belongs. Each element E in this list is stored in the unit 22. It contains a reference identifying the request, a variable C representing its class, a variable P defining its priority and a binary variable W which is equal to 1 if the request is valid and 0 otherwise.

Step E300 is followed by a step E301 during which the client machine 2 extracts the JPEG2000 image data from the SWF file and stores them in the data storage unit 21. In addition, the quality Q of the JPEG2000 image recovered is stored in the unit 21.

Step E301 is followed by a test E302 during which the client machine 2 tests whether the SWF file contains requests in class Rp, that is to say pre-fetching requests, whether these requests be of the Rpl type (associated with the low-quality image), Rpm (medium quality) and/or Rph (high quality). According to a preferred embodiment of the invention, only requests in the Rpl class are present. If the test E302 is negative, it is followed by a test E308 described below.

If the test E302 is positive, the client machine 2 extracts these requests from the SWF file and stores them in the request storage unit 22 (step E303). In addition, for each of the requests extracted, the client machine 2 creates a new element E in the list L.

Step E303 is followed by a step E304 during which the client machine 2 recovers the quality Q stored in the data storage unit 21 and initializes the variables W and C of each of the elements E created at the previous step, in accordance with the following rule:

1) W=1 if the request makes it possible to recover image data of the same quality as the JPEG2000 image stored,
2) W=0 otherwise,
3) C=Rpl if Q=low,
4) C=Rpm if Q=medium,
5) C=Rph if Q=high.

Step E304 is followed by a step E305 during which the client machine 2 calculates the priority P of each of the elements E in accordance with the following equation:

$$P=K1/N \text{ with}$$
$$K1=PRIOMAX=N\text{min}=PRIOMIN=N\text{max}$$

where the values PRIOMIN and PRIOMAX are fixed in advance, and Nmin and Nmax determine the respectively minimum and maximum size of the image data recovered by a request. The only constraint on these four values is that the equation PRIOMIN=Nmax=PRIOMAX=Nmin is satisfied so as to obtain a priority P included in the range [PRIOMIN, PRIOMAX], whatever the request.

Step E305 is followed by a step E306 during which the client machine 2 updates the requests Rp as described below with the help of FIG. 4.

Step E306 is followed by step E307 during which the client machine 2 includes the elements E corresponding to the requests Rp thus formed in the list L.

Step E307 is followed by the test E308 during which the client machine 2 tests whether the SWF file contains requests in class Ra. If test E308 is negative, it is followed by a step E312, described below.

If test E308 is positive, the client machine 2 extracts these requests from the SWF file and stores them in the request storage unit 22 (step E309). In addition, for each of these requests, the client machine 2 creates a new element E and initializes the variables W to 1 and C to Ra.

Step E309 is followed by a step E310 during which the client machine 2 calculates the priority P of each of the elements E thus created in accordance with the following equations:

$$P=PRIOMAX \text{ if current time=time at which the data must be played,}$$

$$P=\max(PRIOMIN,PRIOMAX/(\text{time at which the data must be played}-\text{current time})).$$

Therefore, a priority is dynamically allocated to each of the requests in accordance with the time remaining until the next request.

Thus the change in the priority follows the change over time of the animation. Some data, judged initially to be unnecessary, become necessary in the course of time. Their priority increases accordingly.

Step E310 is followed by a step E311 during which the client machine 2 includes the elements of the requests Ra thus formed in the list L.

Step E311 is followed by the request sending step E312 described below with the help of FIG. 5.

Figure 4:
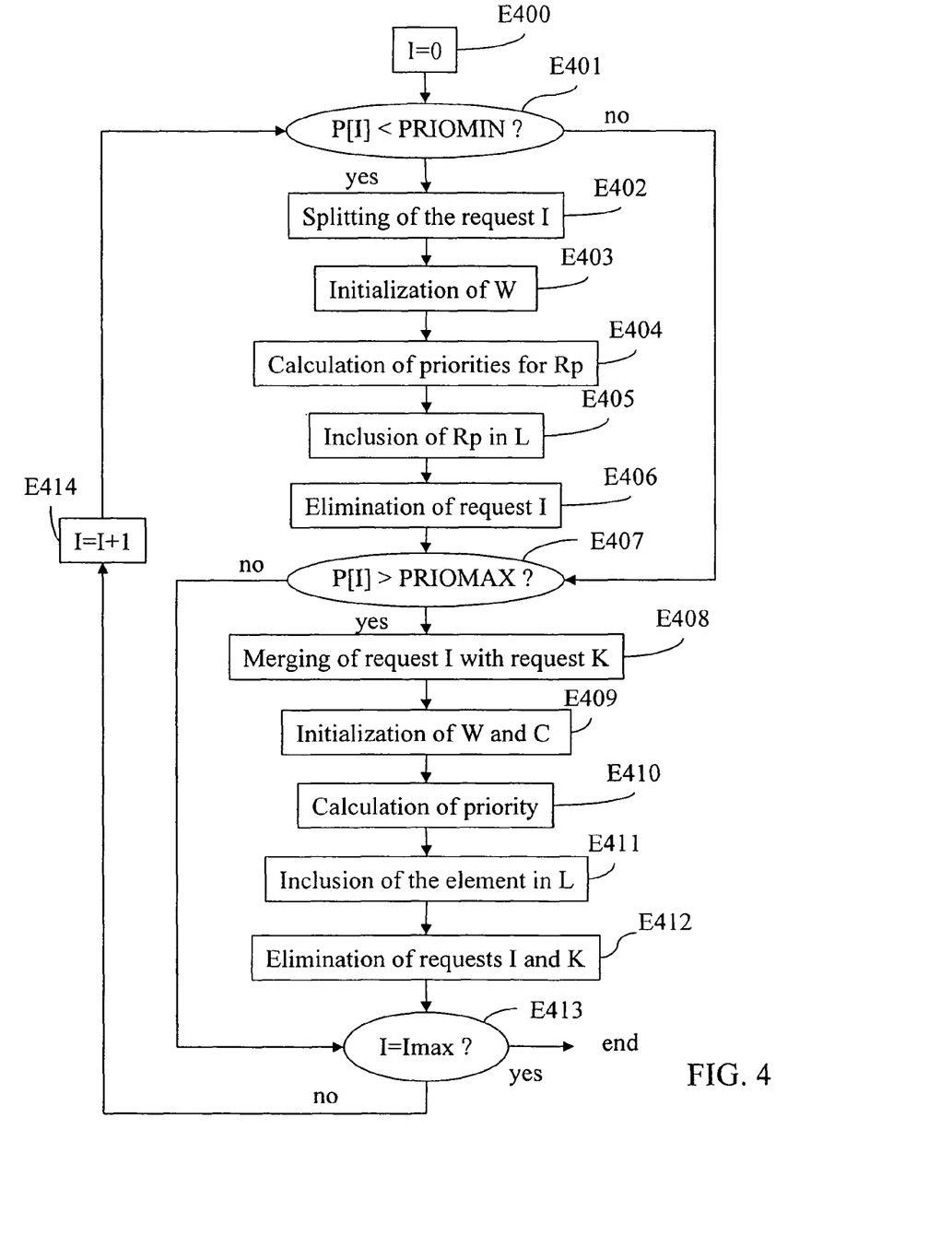
FIG. 4 is a flow diagram illustrating the main steps of the updating of the set of pre-fetching requests in accordance with the present invention, in a particular embodiment.

The flow diagram in FIG. 4 illustrates the updating of a set of requests in class Rp. As was explained when describing FIG. 3, an element E in the list L is associated with each request Rp.

During a step E400, the client machine 2 initializes a counter I to the position of the first element E in the set of requests to be processed.

This step is followed by a test E401 during which the client machine 2 tests whether the priority of the current element I is less than PRIOMIN, that is to say whether the quantity N of the image data recovered by this request is greater than Nmax. If the test E401 is negative, it is followed by a test E407 described below.

In the contrary case, the test E401 is followed by a step E402 during which the request is split into as many requests as is necessary so that each of them recovers a quantity of data less than or equal to Nmax and all the data recovered by these new requests corresponds to the quantity of data which would have been recovered by the initial request. An element E is associated with each of these new requests.

Step E402 is followed by a step E403 during which the client machine 2 initializes the variable W of each of the new elements created in a similar fashion to step E304 in FIG. 3.

The following steps E404 and E405 are identical respectively to steps E305 and E307 in FIG. 3.

Step E405 is followed by a step E406 during which the client machine 2 eliminates the element corresponding to the current request I and the current request I from the request storage unit 22.

This step is followed by the test E407 during which the client machine 2 tests whether the priority of the current element I is greater than PRIOMAX, that is to say whether the quantity N of the image data recovered by this request is less than Nmin. If test E407 is negative, it is followed by a test E413 described below.

In the contrary case, test E407 is followed by step E408 during which the client machine 2 merges this request with the request having the lowest priority (i.e. the highest value of N) so that the sum of the priorities of these two requests (or respectively the sum of the quantities of data recovered by the two requests) is greater (or respectively lower) than PRIOMIN (or respectively Nmax).

Step E408 is followed by a step E409 during which the client machine 2 initializes the variables W and C of the new element created, in a similar fashion to step E304 in FIG. 3.

The following steps E410 and E411 are identical respectively to steps E305 and E307 in FIG. 3.

Step E411 is followed by a step E412 during which the client machine 2 eliminates the elements corresponding to the two merged requests and the two requests from the request storage unit 22.

Step E412 is followed by the test E413 during which the client machine 2 tests whether the current element is the last to be processed. If test E413 is positive, the updating process stops.

Otherwise test E413 is followed by a step E414 which considers the following element (incrementation of the counter I by one unit). Step E414 is followed by the previously described step E401.

Figure 5:
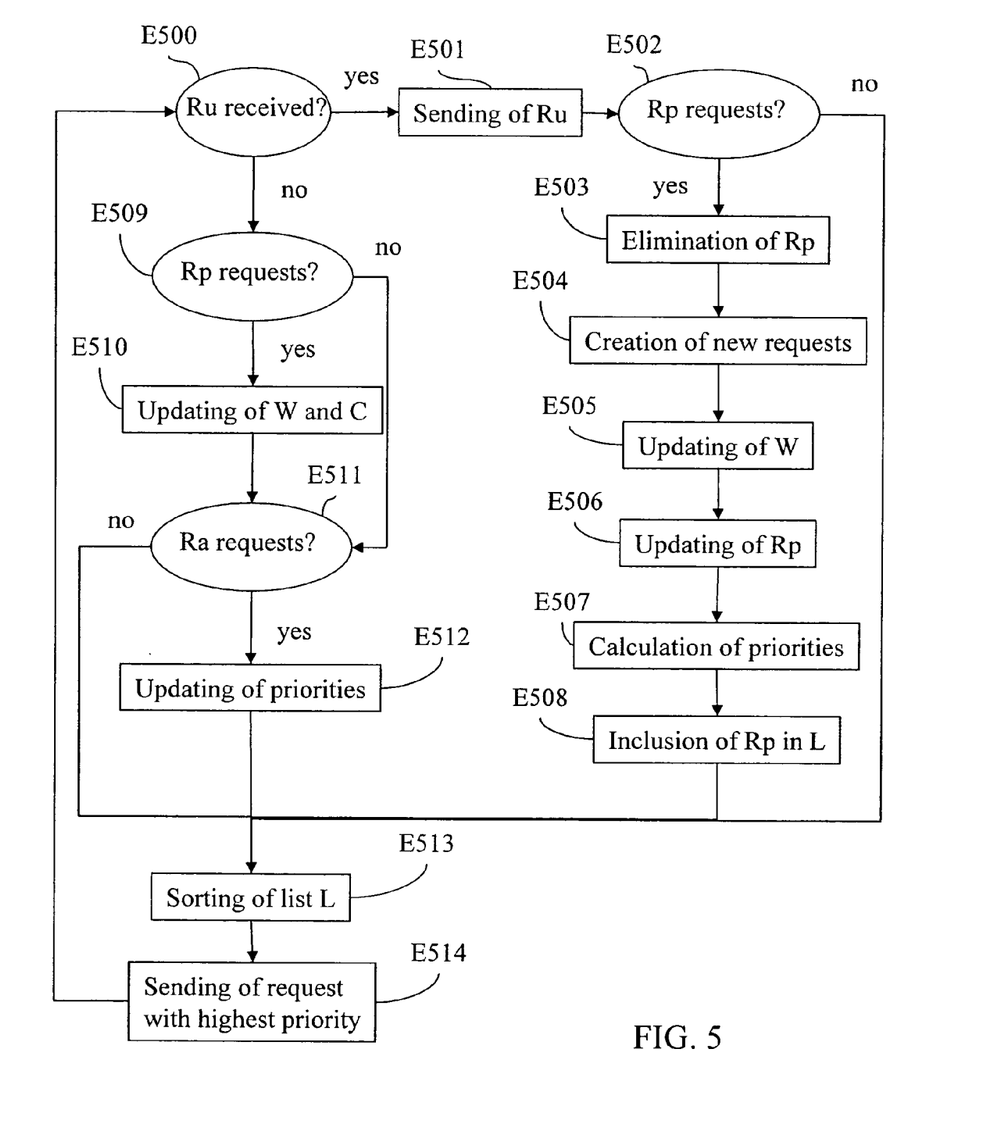
FIG. 5 is a flow diagram illustrating the main steps of the mechanism for sending requests in accordance with the present invention, in a particular embodiment.

The flow diagram in FIG. 5 illustrates the functioning of the device of FIG. 1 once the initialization phase of FIG. 3 has ended.

First of all, during a test 500, the client machine 2 tests whether the user has requested a particular action on the animation from the request reception unit 24. According to a preferred embodiment of the invention, the user has the possibility of requesting three actions on the JPEG2000 image: zoom, pan and change in quality. As soon as an action is requested, it is temporarily stored in the request storage unit 22.

If test 500 is negative, it is followed by a test E509 during which the client machine 2 tests whether requests in class Rp are contained in the list L. If such is the case, the test E509 is followed by a step E510 of updating the variables W and C similar to step E304 in FIG. 3. Step E510 is followed by a test E511 described below.

If test E509 is negative, it is followed by test E511 during which the client machine 2 tests whether requests in the Ra class are contained in the list L. If such is not the case, the test E511 is followed by a step E513 described below. If such is the case, the test E511 is followed by a step E512 during which the client machine 2 updates the requests in the Ra class according to the rule in step E310 in FIG. 3.

Step E512 is followed by step E513 during which the client machine 2 sorts the requests in the list L. According to a preferred embodiment of the invention, the requests are classified according to their priorities and independently of their class, from the most probable to the least probable.

Step E513 is followed by a step E514 during which the client machine 2 sends the request with the highest priority amongst the requests contained in the list L through the request sending unit 25. Once the request is sent, it is eliminated, as well as the associated element from the request reception unit 24 and from the list L.

Step E514 is followed by the previously described test E500. The algorithm stops at step E514 at the request of the user according to a preferred embodiment of the invention.

If test E500 is positive, that is to say if the client has requested a particular action on the animation, test E500 is followed by a step E501 during which the client machine 2 sends the request Ru.

Step E501 is followed by a test E502 during which the client machine 2 tests whether the list L contains elements in class Rp. If such is not the case, test E502 is followed by the previously described step E513.

If the list L contains elements in class Rp, the test E502 is followed by a step E503 during which the client machine 2 eliminates Rp requests (and their associated elements) from the list L and from the request storage unit 22 in accordance with the digital data stored in the data storage unit 21. This is because, as requests are sent, the image data received are stored in this unit. Because of this, in order to avoid requesting the same data several times, some requests in class Rp become obsolete. They are eliminated at this step both from the request storage unit 22 and from the list L.

Step E503 is followed by a step E504 during which the client machine 2 creates new requests in class Rp (and new elements E). This is because, according to the actions of the user, some pre-fetching requests are necessary. For example, if the JPEG2000 image is displayed at low quality and the user wishes to display it at medium quality, the pre-fetching requests for anticipating a zoom or a pan must make it possible to recover image data at medium quality rather than at low quality, so as to display the image at a constant quality.

Step E504 is followed by a step E505 during which the client machine 2 updates the variables W, that is to say enables the requests or not, in a similar fashion to step E304 in FIG. 3.

Step E505 is followed by a step E506 during which the client machine 2 updates the new requests created (if applicable) in a similar fashion to that described by FIG. 4.

Step E506 is followed by a step E507 during which the client machine 2 calculates the priorities of these Rp requests in a similar fashion to step E305 in FIG. 3.

Step E507 is followed by a step E508 during which the client machine 2 includes the new Rp requests in the list L. Step E508 is followed by the previously described step E513.

It should be noted that, where no new request is created at step E504, step E504 is followed by step E513.

Figure 6:
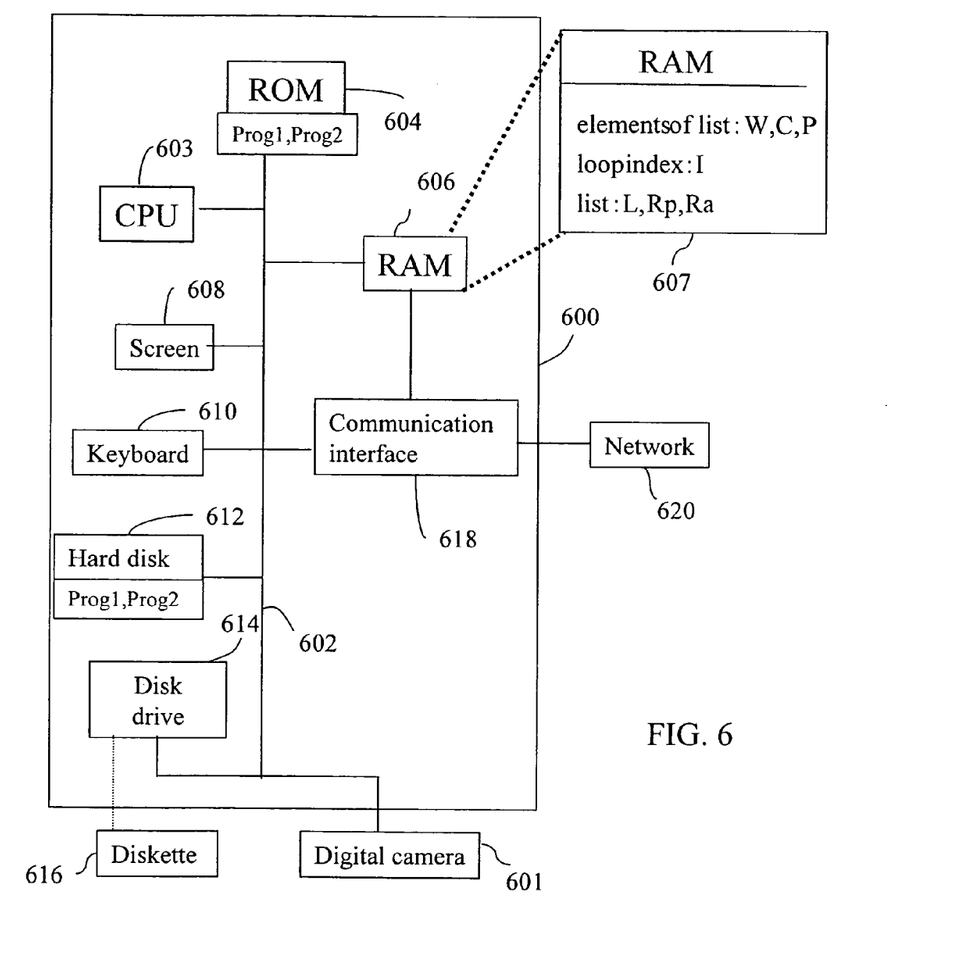
FIG. 6 illustrates schematically a device implementing the present invention, in a particular embodiment.

With reference to FIG. 6, an example of a programmable communication apparatus implementing the invention is described.

This apparatus comprises a transmission management device according to the invention, such as the one depicted in FIG. 1 and whose functioning is described with reference to FIGS. 3 to 5. The apparatus is connected, in an identical fashion to the device in FIG. 1, to a communication apparatus fulfilling the role of server machine.

According to the chosen embodiment depicted in FIG. 6, an apparatus implementing the invention is for example a microcomputer 600 or a work station.

The apparatus 600 comprises a communication bus 602 to which there are connected:

a central processing unit 603 (a microprocessor), which fulfills the function of the control unit 28 of FIG. 1;

a read only memory 604, able to contain the programs "Prog1" and "Prog2";

a random access memory 606, comprising registers 607 adapted to record variables and parameters created and modified during the execution of the aforementioned programs, in particular the list L of the elements and the lists of Rp, Ra requests, the elements in this list L: W, C, P, I, PRIOMAX, PRIOMIN, mentioned with reference to the preceding figures;

a screen 608 for displaying data and/or serving as a graphical interface with the user, who will be able to interact with the programs according to the invention by means of a keyboard 610 or any other means such as a pointing device (not shown), such as for example a mouse or an optical pen;

a hard disk 612 able to contain the aforementioned programs "Prog1" and "Prog2";

a disk drive 614 adapted to receive a diskette 616 and to read or write thereon data processed or to be processed according to the invention;

a communication interface 618 connected to a communication network 620, for example the Internet, the interface being able to transmit and receive data;

a digital camera 601, or any other image acquisition device.

In the case of audio data, the apparatus also comprises an input/output card connected to a microphone (not shown).

The communication bus 602 allows communication and interoperability between the various elements included in the microcomputer 600 or connected to it. The representation of the bus is not limiting and, in particular, the central unit is able to communicate instructions to any element of the microcomputer 600 directly or by means of another element of the microcomputer 600.

The executable code of each program enabling the programmable apparatus to implement the request processing processes according to the invention can be stored for example on the hard disk 612 or in read only memory 604.

According to a variant, the diskette 616 can contain data and the executable code of the aforementioned programs which, once read by the apparatus 600, will be stored on the hard disk 612.

In a second variant, the executable code of the programs can be received through the communication network 620, via the interface 618, in order to be stored as described previously.

The diskettes can be replaced by any information medium such as, for example, a compact disk (CD-ROM) or a memory card. In general terms, an information storage means which can be read by a computer or by a microprocessor, integrated or not into the apparatus, possibly removable, is adapted to store one or more programs whose execution enables the method according to the invention to be implemented.

In more general terms, the program or programs can be loaded in one of the storage means of the apparatus 600 before being executed.

The central unit 603 will control and direct the execution of the instructions or portions of software code of the program or programs according to the invention, instructions which are stored on the hard disk 612 or in the read only memory 604 or in the other aforementioned storage elements. On powering up, the program or programs which are stored in a non-volatile memory, for example the hard disk 612 or the ROM 604, are transferred into the RAM 606, which then contains the executable code of the program or programs according to the invention, as well as registers for storing the variables and parameters necessary for implementing the invention.

It should be noted that the communication apparatus comprising the device according to the invention can also be a programmed apparatus.

This apparatus then contains the code of the computer program or programs, for example fixed in a dedicated integrated circuit (ASIC, in English "Application Specific Integrated Circuit").

The invention claimed is:

1. A method of managing requests in at least two distinct classes, relating to multimedia data, exchanged by a communication apparatus and at least one data source connected through a communication network, said method performed at the communication apparatus and comprising:
   a processor performing the steps of:
   enabling at least one request of at least a first class of requests, the enabling taking account of the multimedia data received from at least a second class of requests, the requests of the second class being predictable in time;
   dynamically allocating a priority to each of the enabled requests, in accordance with characteristics of said enabled requests; and
   dynamically allocating a priority to each of the enabled requests of the second class in accordance with the time remaining until the next request of the second class.

2. The method according to claim 1, further comprising a step of deciding with regard to the transmission of at least one enabled request, according to the priority allocated to said request.

3. The method according to claim 2, further comprising a step of updating the requests in at least the first class, the updating taking account of the multimedia data received from at least one request in at least the second class.

4. The method according to claim 1, wherein said communication apparatus and said data source are connected by a connection of the HTTP type.

5. The method according to claim 1, wherein the multimedia data are Flash animations.

6. The method according to claim 1, wherein said requests are associated with the animation of an object.

7. The method according to claim 1, wherein the multimedia data are image data compressed according to the JPEG2000 standard.

8. The method according to claim 1, wherein said requests are associated with one of the carrying out of a zoom, pan, or a change of quality on an image.

9. The method according to claim 1, wherein said requests are associated with interactions between a user and an animation.

10. A device for managing requests in at least two distinct classes, relating to multimedia data, exchanged by a communication apparatus and at least one data source connected through a communication network, said device comprising:
   enabling means constructed to enable at least one request in at least a first class of requests, the enabling taking account of the multimedia data received from at least a second class of requests, the requests of the second class being predictable in time;
   first allocating means constructed to dynamically allocate a priority to each of the enabled requests, in accordance with characteristics of said enabled requests; and
   second allocating means constructed to dynamically allocate a priority to each of the enabled requests of the second class in accordance with the time remaining until the next request of the second class.

11. The device according to claim 10, further comprising deciding means constructed to decide with regard to the transmission of at least one enabled request, according to the priority allocated to said request.

12. The device according to claim 11, further comprising updating means constructed to update the requests in at least a first class, the updating taking account of the multimedia data received from at least one request in at least the second class.

13. The device according to claim 10, wherein said communication apparatus and said data source are connected by a connection of the HTTP type.

14. The device according to claim 10, wherein the multimedia data are Flash animations.

15. The device according to claim 10, wherein said requests are associated with the animation of an object.

16. The device according to claim 10, wherein the device is comprised in said communication apparatus.

17. The device according to claim 10, wherein said requests are associated with the carrying out of a zoom, pan, or a change of quality on an image.

18. The device according to claim 10, wherein said requests are associated with interactions between a user and an animation.

19. The device according to claim 10, wherein the multimedia data are image data compressed according to the JPEG2000 standard.

* * * * *